United States Patent [19]

Kanó et al.

[11] Patent Number: 4,512,015
[45] Date of Patent: Apr. 16, 1985

[54] DIGITAL TIME-DIVISION SWITCH

[75] Inventors: Yoshiharu Kanó; Makoto Fujisawa, both of Yokohama; Shoji Nojiri, Kawasaki; Yoshikazu Tanaka, Yokohama, all of Japan

[73] Assignee: Fujitsu Limited, Kawasaki, Japan

[21] Appl. No.: 453,574

[22] Filed: Dec. 27, 1982

[30] Foreign Application Priority Data

Dec. 29, 1981 [JP] Japan ................ 56-213405

[51] Int. Cl.³ .............................................. H04J 3/12
[52] U.S. Cl. .................................................. 370/110.1
[58] Field of Search ........................... 370/110.1, 110.2

[56] References Cited

U.S. PATENT DOCUMENTS

| 4,268,722 | 5/1981 | Little et al. | 370/110.1 |
| 4,354,264 | 10/1982 | Wurst | 370/110.1 |
| 4,430,733 | 2/1984 | Hardy et al. | 370/110.1 |
| 4,437,182 | 3/1984 | Lambert et al. | 370/110.1 |
| 4,437,183 | 3/1984 | Profet | 370/110.1 |

FOREIGN PATENT DOCUMENTS 0005220 11/1979 European Pat. Off. .

OTHER PUBLICATIONS

International Switching Symposium, S. Kutsukake et al., "A Digital Switching System for Central Office", Montreal, Sep. 21-25, 1981.
Review of Electrical Communication Laboratories, Kaneko et al., "Signalling Equipment for Digital Switching System", vol. 27, No. 9/10, Sep./Oct., 1979.
Post Office Electrical Engineers Journal, Potter, "Monarch 120-A New Digital PABX", vol. 73, Apr. 1980.

Primary Examiner—Douglas W. Olms
Assistant Examiner—Kenneth I. Rokoff
Attorney, Agent, or Firm—Staas & Halsey

[57] ABSTRACT

A digital time-divison switch comprising a multiplexer which multiplexes digitalized voice signals, supervisory signals transmitted from line circuit portions, and so forth, and which inserts these signals into predetermined time slots. The digital switch also includes a signal-extracting circuit which extracts the supervisory signals from the time slots assigned for control signals and which transmits the extracted supervisory signals to a common control unit through the supervisory signal receiver, a switching network which switches data time slots, a signal inserting circuit for transmitting control signals to the line circuit portions, and a distributor circuit for distributing the voice signals and so on to each line circuit. The switch further includes a second signal-inserting circuit disposed between the signal-extracting circuit and the switching network, the second signal-inserting circuit inserting one-way signals transmitted from a switching network portion to the line circuit portions into the time slots assigned for control signals, in the other words into time slots into which supervisory signals extracted by the signal-extracting circuit are previously inserted.

9 Claims, 8 Drawing Figures

DIGITAL TIME-DIVISION SWITCH

BACKGROUND OF THE INVENTION (1) Field of the Invention

The present invention relates to a digital time-division switch. More particularly, it relates to a digital time-division switch in which the time slots of a time-division transmission line and of a switching network portion are effectively utilized.

(2) Description of the Prior Art

In a general digital time-division switch, supervisory signals, voice signals, tone signals, and so forth transmitted from each line circuit portion, including subscriber circuits, interoffice trunks, a tone truck, and so on are multiplexed in a time-division manner forth, the same transmission line and are transmitted to a switching network portion including a switching network, i.e., a speech network formed, for example, of memory circuits. Control signals, transmitted from a common control unit, for controlling the line circuit portions are multiplexed in a time-division manner with voice signals transmitted from the switching network portion and are transmitted to the line circuit portion through the same transmission line. Therefore, the time slots of the time-division transmission line are assigned for other signals in addition to voice signals, i.e., supervisory signals, tone signals, control signals, and so forth. In this situation, it is preferable that the number of time slots assigned for signals other than voice signals be as small as possible in order to increase the number of voice channels per transmission line.

Figure 1:
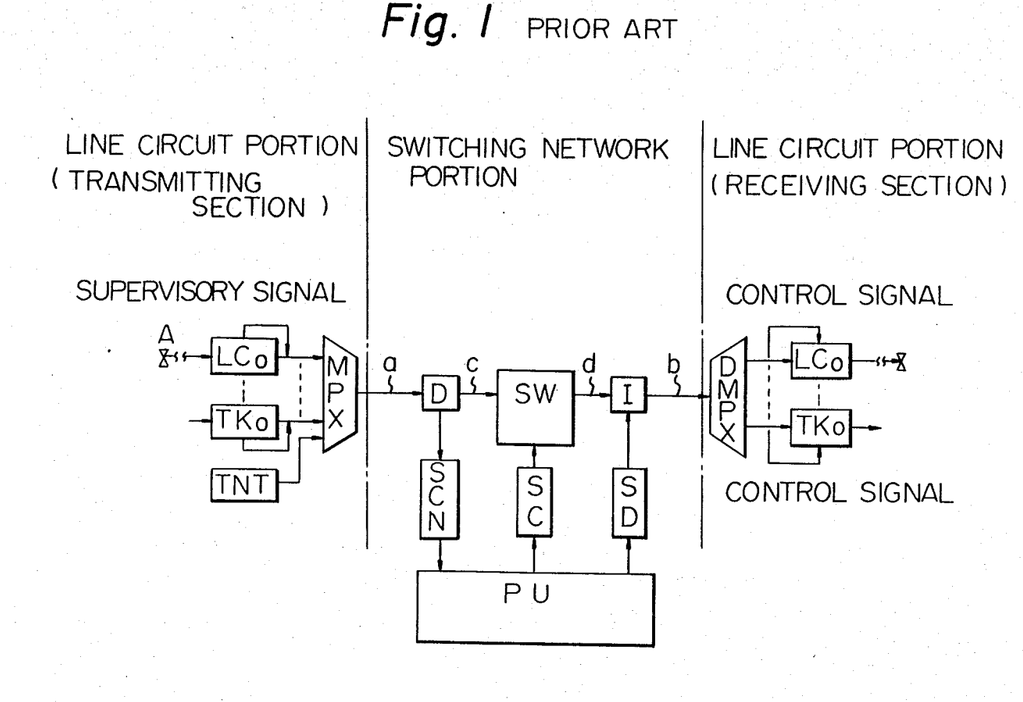
FIG. 1 is a block circuit diagram schematically illustrating the structure of a conventional digital time-division switch.

FIG. 1 illustrates the structure of a conventional digital time-division switch. In FIG. 1, subscriber circuits are designated by LC0, - - - , interoffice trunk circuits are designated by TK0, a tone trunk circuit for generating tone signals is designated by TNT, and a multiplexer for multiplexing a plurality of input signals is designated by MPX. All of these circuits constitute the transmitting section of the line circuit portion. D is a signal-extracting circuit, i.e., a dropper which extracts supervisory signals from the transmission line. SCN is a supervisory signal receiver which receives supervisory information, i.e., scanned information, from the subscriber circuits and the trunk circuits. SW is a switching network which operates in a time-division manner. SC is a switch controller for controlling the switching network SW. I is a signal-inserting circuit, i.e., an inserter which inserts control signals in the transmission line. SD is a supervisory data SD sender for transmitting control data, i.e., SD data to the subscriber circuits and the trunk circuits. All of these components are included in a switching network portion. PU is a common control unit or a processor for controlling the switching process. DMPX is a distributor circuit or a demultiplexer which converts time-division multiplexed signals on the transmission line into separate line signals. The distributor circuit DMPX and the aforementioned subscriber circuits LC0, - - - and interoffice trunk circuits TK0 constitute the receiving section of the line circuit portion. In FIG. 1, the transmitting section of the line circuit portion is shown on the left and the receiving section of the line circuit portion is shown on the right. However, in practice, these two sections are not separated, i.e., they are included in one circuit block constituting the line circuit portion.

In the switch of FIG. 1, a voice signal transmitted from a subscriber, for example, subscriber A connected to a subscriber circuit LC0, is converted to a digital signal, such as a pulse-code modulation signal, in the subscriber circuit LC0 and is inserted into a predetermined time slot of a transmission line as a time-division signal by the multiplexer MPX. The time-division signal is switched to another time slot corresponding to the other subscriber (not shown) by the switching network SW controlled by switch controller SC and is transmitted to the distributor circuit DMPX. The distributor circuit DMPX distributes the time-division signal to the receiving section of the subscriber circuit of the other subscriber, in which circuit the time-division signal, i.e., the digital signal, is converted to an original analog voice signal and is then transmitted to the other subscriber.

In the above-mentioned switch, the supervisory signals of the subscriber circuits and so forth, obtained by scanning the subscriber circuits, for example, on-hook or off-hook signals of each subscriber circuit, are multiplexed with the voice signals, and are transmitted on the same transmission line as that used for transmitting the voice signals. The supervisory signal is extracted by the signal-extracting circuit D and is transmitted to the common control unit PU through the supervisory signal receiver SCN. On the other hand, SD data, i.e., control data transmitted from the common control unit PU, for example, data for controlling the drive of a ringing current feeding relay, is transmitted to the signal-inserting circuit I connected to the output stage of the switching network SW through the data sender SD. The SD data is multiplexed in a time-division manner with other signals, such as voice signals, in the inserting circuit I and is transmitted to the distributor circuit DMPX, which then transmits the SD data to a subscriber circuit and so forth.

A tone signal, for example, a dial tone signal, generated by the tone trunk TNT disposed in a line circuit portion is multiplexed in a time-division manner in the multiplexer MPX and is transmitted to a subscriber telephone through the same transmission line as the voice signals and through the switching network SW, the distributor circuit DMPX, and a subscriber circuit.

Figure 2:
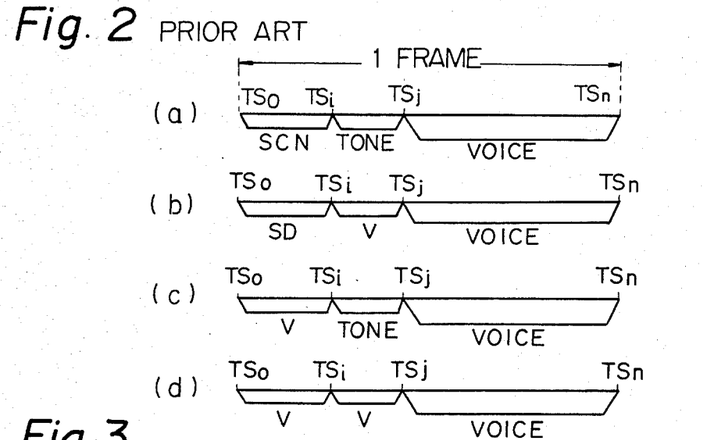
FIG. 2 is a diagram illustrating the assignment of time-division signals in each portion of the switch of FIG. 1.

FIG. 2 illustrates the assignment of multiplexed data at each point on the transmission line of the switching network portion in the switch of FIG. 1. In FIG. 2, (a) through (d) illustrate, respectively, the assignment of the data of each frame of the multiplexed signals at points a through d of the transmission line shown in FIG. 1. At point a, supervisory data (SCN) resides in time slots $TS_0$ through $TS_i$, and tone signals transmitted from the tone trunk TNT resides in time slots $TS_{i+1}$ through $TS_j$. At the input stage c of the switching network SW, the time slots $TS_0$ through $TS_i$ represented by the symbol V are not used due to the supervisory data being previously extracted therefrom by the signal extracting circuit D. At the point d of the switching network SW, the time slots $TS_{i+1}$ through $TS_j$ are vacant due to the tone signals therein being transferred to the time slots within the time slots $TS_{j+1}$ through $TS_n$ for voice signals. At the point b, SD data is inserted into the time slots $TS_0$ through $TS_i$ by the signal-inserting circuit I.

Figure 3:
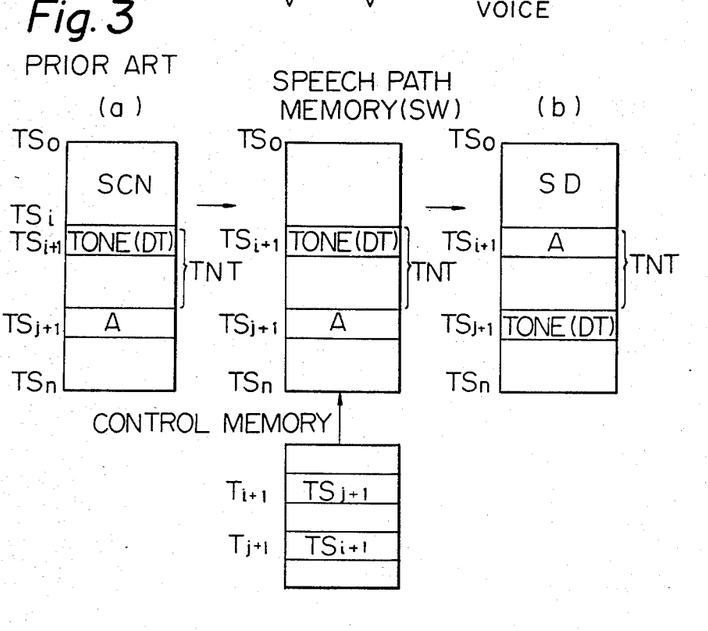
FIG. 3 is a diagram illustrating the contents of time-division data in a switching network and a control memory of the switch of FIG. 1.

FIG. 3 illustrates the contents of data stored in a speech path memory comprising a switching network SW and in a control memory CM provided in a switch controller SC. In FIG. 3, (a) and (b) illustrate the contents of a frame of data in another manner at points a and b of the transmission line in FIG. 1, respectively, and correspond to (a) and (b) of FIG. 2, respectively.

In FIG. 3, the contents of data stored in the speech path memory corresponds to the contents of data at the input stage c of the switching network SW which is shown in (c) of FIG. 2. The speech path memory has addresses $TS_0$ through $TS_n$ corresponding to the time slots $TS_0$ through $TS_n$. In FIG. 3, the addresses of the speech path memory are designated by the same symbols as those of the corresponding incoming time slot numbers. In the addresses $TS_0$ through $TS_i$ of the speech path memory, no significant data is stored, and in the addresses $TS_{i+1}$ through $TS_j$, tone signal data is stored. In the addresses $TS_{j+1}$ through $TS_n$, voice signal data is stored. For example, in the address $TS_{i+1}$ corresponding to the time slots $TS_{i+1}$, dial tone (DT) data transmitted from the tone trunk is stored, and in the address $TS_{j+1}$ corresponding to the time slot $TS_{j+1}$, voice signal data from the subscriber A is stored.

Each address of the control memory stores a time slot number or destination address. The control memory effects a switching operation by sequentially reading out the data (destination address) stored in the control memory from the first address to the last address thereof and by inserting the data stored in the corresponding sequential addresses of the speech path memory, which destination addresses are designated by the content stored in each address of the control memory, into the outgoing time slots corresponding to the destination addresses in the control memory. For example, assume that the time slot number $TS_{j+1}$ is stored in the address $T_{i+1}$ of the control memory and that another time slot number $TS_{i+1}$ is stored in the address $T_{j+1}$ of the control memory. In this condition, at the output stage of the switching network, voice signal data, which was originally in incoming time slot $TS_{j+1}$, transmitted from the subscriber A is inserted into the outgoing time slot $TS_{i+1}$, and dial tone signal data, which was originally in incoming time slot $TS_{i+1}$, transmitted from the tone trunk TNT is inserted into the time slot $TS_{j+1}$. Therefore, at point b of the transmission line, the voice signal of the subscriber A and the dial tone signal data transmitted from the tone trunk TNT are assigned in the time slots $TS_{i+1}$ and $TS_{j+1}$, respectively, and, moreover, SD data is inserted into the time slots $TS_0$ through $TS_i$ by the signal-inserting circuit I, as is shown in (b) of FIG. 3. As a result, the dial tone signal data inserted into the time slot $TS_{j+1}$ is transmitted to the receiving section of the line circuit of the subscriber A.

In the above-mentioned conventional switch, since the time slots allocated for the supervisory data and for the control signals are vacant inside the switching network SW, they are inefficiently utilized.

Further, in the above-mentioned conventional switch, tone signals which are transmitted from the switch to each subscriber, such as a dial tone signal or a ring back tone signal, are inserted into the time slots for voice signals transmitted from the transmitting section of the line circuit portion. Since such tone signals are only transmitted one way and do not necessitate time slots for receiving signals from the switching network SW, the time slots for receiving signals from the switching network SW are inefficiently utilized.

Figure 4:
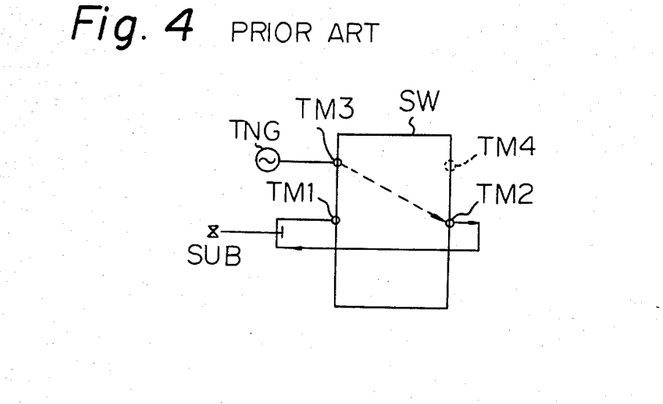
FIG. 4 is a diagram schematically illustrating transmitting terminals and receiving terminals of switching network of a general time-division switch.

As is diagrammatically illustrated in FIG. 4, the switching network SW of a time-division switch generally comprises transmitting terminals, i.e., time slots for transmitting signals (TM1, TM3, etc.), and receiving terminals, i.e., time slots for receiving signals (TM2, TM4, etc.). In the case of voice signals, both the transmitting terminal and the receiving terminal, for example, TM1 and TM2, are used. However, in the case of tone signals, a tone signal transmitted from a tone generator TNG is input into the transmitting terminal, for example, TM3, and the receiving terminal, for example, TM4, corresponding to the transmitting terminal TM3 is not used. Therefore efficient utilization of the time slots is not realized.

Moreover, in the above-mentioned conventional switch, since tone signals are transmitted via part of the time slots which could be used for voice signals, the number of time slots which are actually used for transmitting the voice signals is thereby relatively decreased. Therefore, the number of subscribers connected to a line circuit portion is small, and the degree of multiplex of the time-division switch is relatively decreased.

SUMMARY OF THE INVENTION

It is an object of the present invention to make it possible to effectively utilize the time slots of a switching network of a digital time-division switch, i.e., it is an object of the present invention to avoid decreasing the number of subscribers connected to a line circuit portion, thereby increasing the degree of multiplex of a digital time-division switch.

According to the present invention, there is provided a digital time-division switch comprising a multiplexer which multiplexes digitalized voice signals, supervisory signals transmitted from line circuit portions, and so forth and which inserts these signals into predetermined time slots, a signal-extracting circuit which extracts the supervisory signals from the time slots allocated for control signals and which transmits the extracted supervisory signals to a common control unit through the supervisory signal receiver, a switching network which changes data time slots, a signal-inserting circuit for transmitting control signals to the line circuit portions, and a distributor circuit for distributing voice signals and so on to each line circuit. The present invention further comprises a second signal-inserting circuit disposed between the signal-extracting circuit and the switching network and which inserts signals to be transmitted from a switching network portion to the line circuit portions into the time slots assigned for control signals, in the other words into time slots into which supervisory signals extracted by the signal-extracting circuit are previously inserted.

DESCRIPTION OF THE PREFERRED EMBODIMENTS

Figure 5:
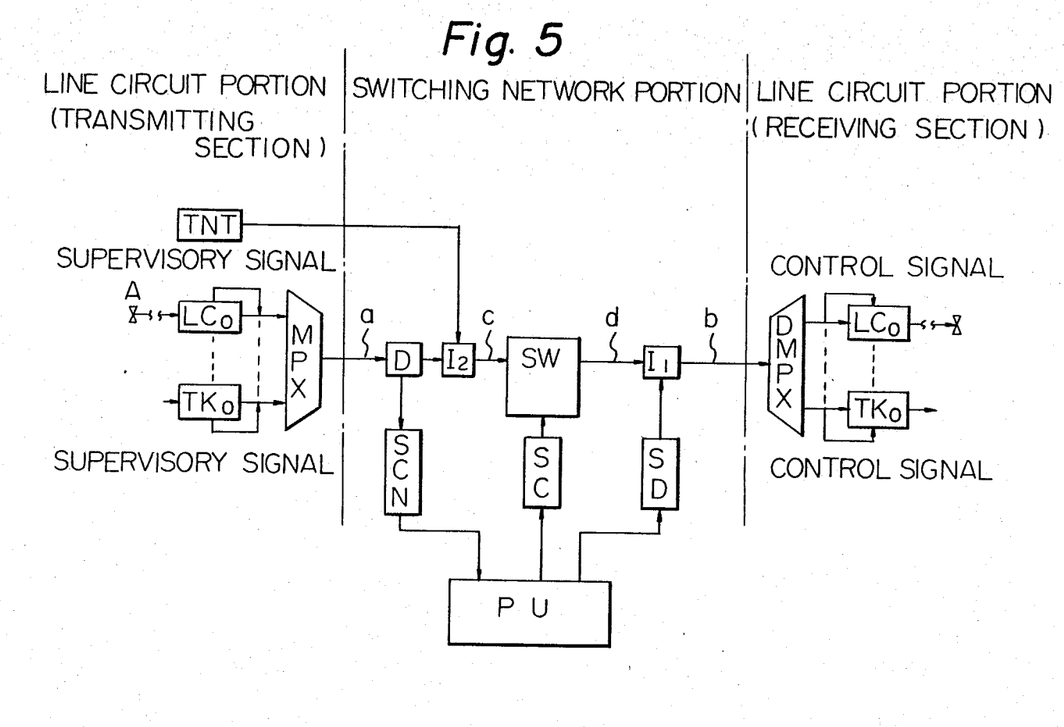
FIG. 5 is a block circuit diagram schematically illustrating the structure of a digital time-division switch which is an embodiment of the present invention.

The embodiments of the present invention will now be explained with reference to the attached drawings. FIG. 5 illustrates the structure of a digital time-division switch, which is an embodiment of the present invention. The switch of FIG. 5 comprises two signal-inserting circuits $I_1$ and $I_2$. The signal-inserting circuit $I_1$ corresponds to the signal-inserting circuit I of FIG. 1 and is disposed between a switching network SW of a switching network portion and a demultiplexer DMPX. The other signal-inserting circuit $I_2$ is disposed between a signal-extracting circuit D and the switching network SW. The signal-inserting circuit $I_2$ inserts tone signals, generated by a tone truck TNT, into a vacant time slot, from which the signal-extracting circuit D previously extracted supervisory data transmitted from a line circuit portion. The other portions of FIG. 5 are substantially the same as those of FIG. 1 and are designated by the same reference symbols.

Figure 6:
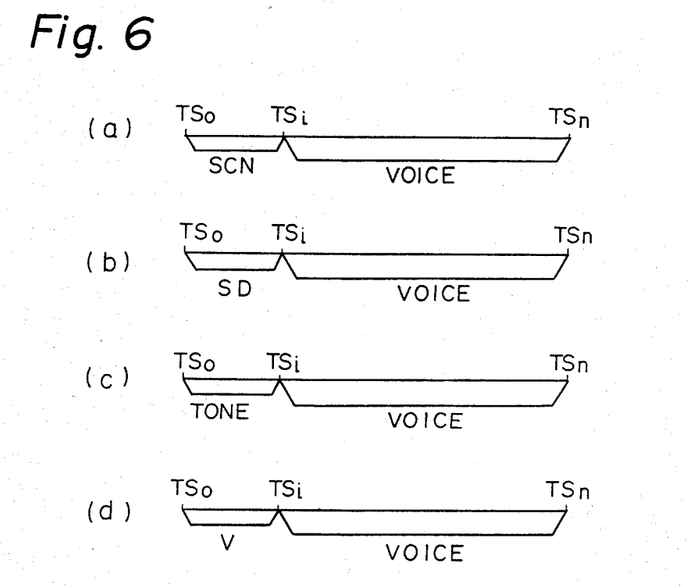
FIG. 6 is a diagram illustrating the assignment of time-division signals in each portion of the switch of FIG. 5.

FIG. 6 illustrates the assignment of the data of one frame at points a through d of the transmission line of the switching network portion of the above-mentioned switch. As is illustrated in FIG. 6 (a), at point a, the supervisory data resides in the time slots $TS_0$ through $TS_i$ of the transmitting section of a line circuit portion, and the other time slots $TS_{i+1}$ through $TS_n$ are used for voice signals. The supervisory data is extracted by the signal-extracting circuit D and is transmitted to a common control unit PU through a supervisory signal receiver SCN. Then the signal-inserting circuit $I_2$ disposed between the signal-extracting circuit D and the transmitting terminal of the switching network SW inserts tone signals, such as dial tone signals and so forth, into the time slots $TS_0$ through $TS_i$, as is illustrated in FIG. 6 (c). At the switching network SW, the tone signal data inserted into the time slots $TS_0$ through $TS_i$ in the transmitting terminal of the switching network SW is transferred to other time slots corresponding to the predetermined terminating subscribers by the common control unit PU and a switch controller SC. Therefore, at point d, which corresponds to the receiving terminal of the switching network SW, the time slots $TS_0$ through $TS_i$ have become vacant. Into these vacant time slots $TS_0$ through $TS_i$, control data for controlling the line circuit portions is inserted by the common control unit PU via a data sender SD and the signal-inserting circuit $I_1$ and is transmitted to the receiving section of a line circuit portion. As a result, at point b, control data is assigned in the time slots $TS_0$ through $TS_i$, and voice signal data is assigned in the time slots $TS_{i+1}$ through $TS_n$. Therefore, according to the present invention, it is possible to use all of the time slots $TS_{i+1}$ through $TS_n$ for voice signals.

Figure 7:
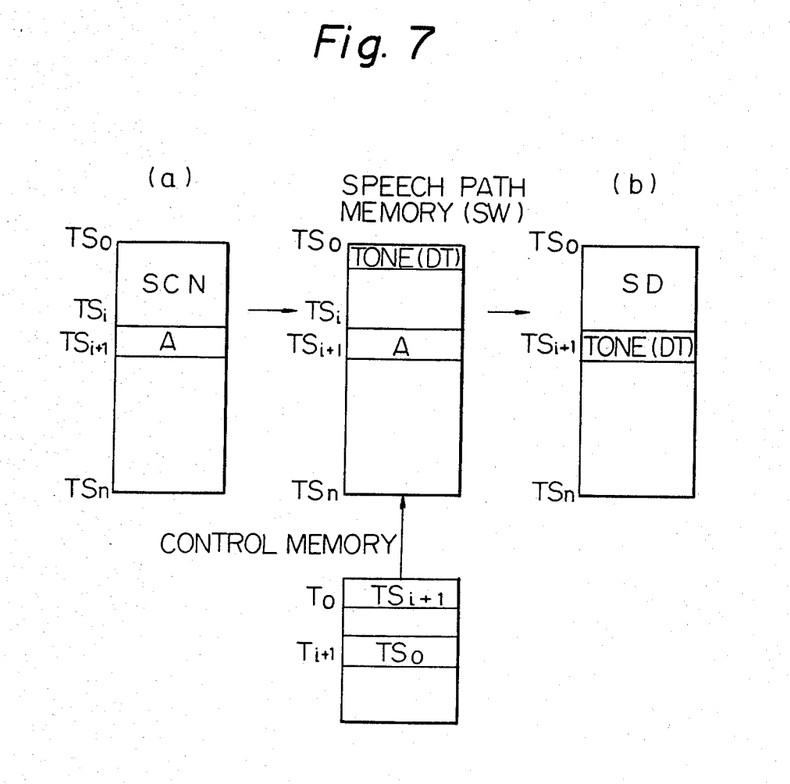
FIG. 7 is a diagram illustrating the contents of time-division data in a switching network and a control memory of the switch of FIG. 5.

FIG. 7 illustrates the contents of data stored in the speech path memory and the control memory of the switch of FIG. 5 and corresponds to FIG. 3, which illustrates the contents of the data of the conventional switch. In FIG. 7, (a) and (b) illustrate the contents of the frame of data in another manner at points a and b of the transmission line in FIG. 5, respectively, and correspond to (a) and (b) of FIG. 6.

In FIG. 7, the contents of data stored in the speech path memory corresponds to that of data in the transmitting terminal of the switching network SW, i.e., at the point c of FIG. 5. At the point c, it is possible to insert tone signal data transmitted from a tone trunk TNT into the time slots $TS_0$ through $TS_i$. For example, at the point c, dial tone signal data is inserted into the time slot $TS_0$, and voice signal data transmitted from a subscriber A is inserted into the time slot $TS_{i+1}$ within the time slots $TS_{i+1}$ through $TS_n$ for voice signals. Therefore, in the speech path memory, dial tone signal data generated by the tone trunk TNT is stored in the address $TS_0$, which corresponds to the time slot designated by the same symbol, and voice signal data transmitted from the subscriber A is stored in the address $TS_{i+1}$. Assume that the time slot numbers $TS_{i+1}$ and $TS_0$ are stored in the addresses $T_0$ and $T_{i+1}$ of the control memory, respectively. In this condition, the control memory switches the time slots so that voice signal data transmitted from the subscriber A is inserted into the time slot $TS_0$ and dial tone signal data transmitted from the tone trunk TNT is inserted into the time slot $TS_{i+1}$ at point d. Further, the signal-inserting circuit $I_1$ arranged between the switching network SW and the receiving section of a line circuit portion inserts SD data into the time slots $TS_0$ through $TS_i$. Therefore, at point b, the contents of the frame of data is as is illustrated in FIG. 7 (b), and thereby dial tone signal data is transmitted to the subscriber A and SD data is transmitted to the receiving section of each of the subscriber circuits.

In the above-mentioned switching operation, the writing of data into the speech path memory and the reading out of data from the speech path memory are effected under the control of the common control unit PU by the control memory in the switch controller SC. The writing in of data transmitted from the input transmission line is effected sequentially in the order of the time slot numbers. That is, the data existing in each of the time slots of the transmission line is sequentially written into the addresses of the speech path memory, the addresses each corresponding to a time slot. For example, the data of the time slots $TS_0$, $TS_1$, - - -, $TS_n$ is sequentially written into the addresses $TS_0$, $TS_1$, - - -, $TS_n$ of the speech path memory. The reading out of data from the speech path memory is effected by using the readout data of the control memory. Data is read out of the control memory sequentially and is read out of the speech path memory by using the contents sequentially read out of the control memory as address data. The data read out of the speech path memory is sequentially inserted into the time slots of the output transmission line. Thus, switching of the time slots is done in the speech path memory. For example, in the example of FIG. 7, data is sequentially read out of the control memory at addresses $T_0$, $T_1$, - - -, $T_{i+1}$, - - -, and, therefore, the data $TS_{i+1}$, - - -, $TS_0$, - - - is read out. Data is read out of the speech path memory in the order of the addresses $TS_{i+1}$, - - -, $TS_0$, - - - . Consequently, the data read out of the speech path memory is A, - - -, dial tone, - - -, with A designating the voice signal data transmitted from the subscriber A and the dial tone signal data DT transmitted from the tone trunk. This data is sequentially inserted into the time slots of the output transmission line.

In the above-mentioned embodiment, the signals, i.e., one-way signals, inserted by the signal-inserting circuit $I_2$ into the time slots $TS_0$ through $TS_i$ assigned for control signals are not limited to tone signals, such as call progress tones including a dial tone, a busy tone and a ring back tone, or tone signals such as address signaling tones including multi-frequency signals (MF), but various one-way signals can be inserted into the time slots. For example, the one-way signals may be announcement transmitted from the switch to each subscriber.

Each of the one-way signals can be inserted into a time slot which is determined in accordance with the type of the one-way signals, in order to simplify the switching process effected by the common control unit PU. For example, dial tone data can be inserted into the time slot $TS_1$ and busy tone data is inserted into the time slot $TS_2$, by the signal-inserting circuit $I_2$.

Figure 8:
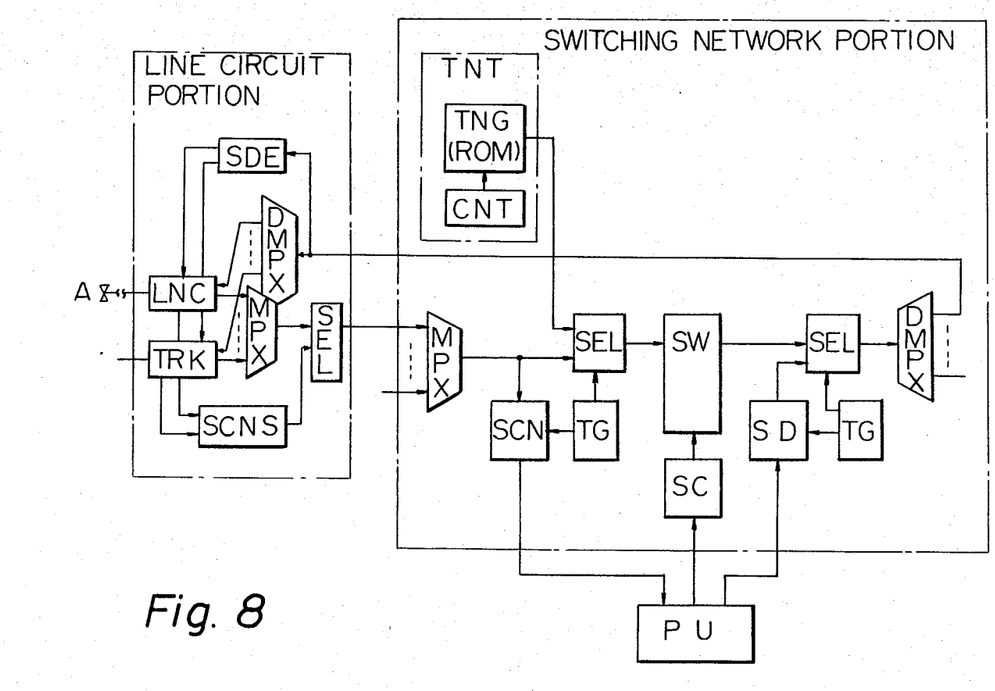
FIG. 8 is a block circuit diagram illustrating in detail the structure of a digital time-division switch which is another embodiment of the present invention.

FIG. 8 illustrates in detail the structure of a digital time-division switch which is another embodiment of the present invention. The switch of FIG. 8 is substantially the same as that of FIG. 5 except that the tone trunk TNT is disposed in the switching network portion. In FIG. 8, the transmitting section and the receiving section of the line circuit portion are illustrated as one unit according to the structure in actual practice. The symbol LNC in the line circuit portion designates a subscriber circuit including a transmitting portion and a receiving portion, and the symbol TRK designates an interoffice trunk including a transmitting portion and a receiving portion. The symbol SDE designates an SD data-extracting circuit which extracts SD data from the predetermined time slots of a transmission line. The symbol SCNS designates a supervisory data-transmitting circuit which transmits supervisory data transmitted from the subscriber circuit LNC and the interoffice trunk TRK to a signal selector SEL. The signal selector SEL has the same function as the aforementioned signal-inserting circuit $I_1$ or $I_2$ and selects predetermined input signals for each time slot and inserts the predetermined input signals into each corresponding time slot. The tone trunk TNT in the switching network portion is used for generating a tone signal and comprises a tone signal generator which is comprises of, for example, a counter CNT for counting a predetermined clock pulse and for generating address signals and a read-only memory (ROM) for storing tone signal waveform data. TG designates a timing pulse-generating circuit which transmits gate pulses corresponding to predetermined time slots to the selector SEL, connected between a multiplexer MPX and a switching network SW, and to a supervisory data receiving circuit SCN or to the selector SEL, connected between switching network SW and a demultiplexer DMPX, and to a control data-transmitting circuit SD. In the switch of FIG. 8, both multiplexers MPX and demultiplexes DMPX are provided in the switching network portion and in the line circuit portion in order to increase the number of channels of the time-division multiplex transmission line. The other portions of FIG. 8 are the same as those of the switch of FIG. 5 and are designated by the same reference symbols.

From the above description and from the above explanation of the operation of the switch of FIG. 5, operation of the switch of FIG. 8 will be easily understood by those skilled in the art. Therefore, an explanation thereof is omitted here.

According to the present invention, one-way signals, for example, tone signals, which are transmitted from the switching network portion to the receiving section of a line circuit portion are inserted into the time slots of the switching network, which time slots correspond to the time slots assigned for supervisory data and control data. The signals are not inserted into the time slots assigned for voice signals. Therefore, the time slots of the switching network are effectively used, thereby making it possible to increase the number of multiplex channels of a transmission line.

We claim:
1. A digital time-division switch, comprising:
line circuit portions;
a common control unit; and
a switching network portion comprising:
  a supervisory signal receiver;
  a multiplexer which multiplexes digitalized voice signals, supervisory signals transmitted from the line circuit portions, and which inserts said signals into predetermined time slots;
  a signal-extracting circuit, operatively connected to said multiplexer and said supervisory signal receiver, which extracts said supervisory signals from time slots assigned for control signals and which transmits said extracted supervisory signals to the common control unit through said supervisory signal receiver;
  a switching network, operatively connected to said common control unit, which switches data time slots;
  a first signal-inserting circuit, operatively connected to said switching network and said common control unit, for transmitting control signals to said line circuit portions;
  a distributor circuit, operatively connected to said first signal-inserting circuit and said line circuit portions, for distributing the voice signals and control signals to each line circuit portion; and
  a second signal-inserting circuit, operatively connected between said signal-extracting circuit and said switching network, said second signal-inserting circuit inserting one-way signals into said time slots assigned for control signals, so that the one-way signals are inserted into the time slots into which supervisory signals extracted by said signal-extracting circuit were previously inserted.

2. A switch according to claim 1, wherein said one-way signals are tone signals.

3. A switch according to claim 2, wherein said tone signals are call progress tones.

4. A switch according to claim 2, wherein said tone signals are address signaling tones.

5. A switch according to claim 2, further comprising tone trunks in which said tone signals are generated.

6. A switch according to claim 5, wherein said tone trunks are disposed in said switching network portion of said switch.

7. A switch according to claim 5 or 6, wherein said one or more of said tone trunks comprises a memory, operatively connected to said second signal-inserting circuit, for storing and outputting waveform data of said tone signals and an address counter, operatively connected to said memory, for supplying address signals to said memory to generate said tone signals.

8. A switch according to claim 1, wherein said one-way signals are announcement signals transmitted by said switch to subscribers.

9. A switch according to claim 1, wherein each of said one-way signals is inserted into a time slot which is determined in accordance with the type of said one-way signals.

* * * * *

UNITED STATES PATENT AND TRADEMARK OFFICE
CERTIFICATE OF CORRECTION

PATENT NO. : 4,512,015
DATED : April 16, 1985
INVENTOR(S) : YOSHIHARU KANO ET AL.

It is certified that error appears in the above-identified patent and that said Letters Patent is hereby corrected as shown below:

Col. 1, line 16, delete "forth,".

Col. 2, line 52, "resides" should be --reside--.

Col. 3, line 16, "slots" should be --slot--.

Col. 4, line 59, begin "Fig. 4..." as a new paragraph.

Col. 7, line 10, "ment" should be --ments--;

line 41, delete "is";

line 42, delete "of".

Signed and Sealed this

Twenty-second Day of October 1985

[SEAL]

Attest:

Attesting Officer

DONALD J. QUIGG

Commissioner of Patents and
Trademarks—Designate